United States Patent
Hwang

(10) Patent No.: US 9,941,833 B2
(45) Date of Patent: Apr. 10, 2018

(54) CONVERTER FOR HYBRID ELECTRIC VEHICLE SYSTEM

(71) Applicant: Hyundai Mobis Co., Ltd., Seoul (KR)

(72) Inventor: Soo Bin Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 83 days.

(21) Appl. No.: 15/273,907

(22) Filed: Sep. 23, 2016

(65) Prior Publication Data

US 2017/0093322 A1    Mar. 30, 2017

(51) Int. Cl.
| | | |
|---|---|---|
| H02P 27/08 | (2006.01) | |
| B60L 11/18 | (2006.01) | |
| B60K 6/22 | (2007.10) | |

(52) U.S. Cl.
CPC ............... *H02P 27/08* (2013.01); *B60K 6/22* (2013.01); *B60L 11/1812* (2013.01); *B60Y 2200/92* (2013.01); *B60Y 2300/18125* (2013.01); *B60Y 2400/61* (2013.01); *Y10S 903/904* (2013.01)

(58) Field of Classification Search
CPC .............................. H02P 27/08; B60L 11/1812
See application file for complete search history.

(56) References Cited

U.S. PATENT DOCUMENTS

| | | | | |
|---|---|---|---|---|
| 2012/0299560 A1* | 11/2012 | Gu | ....................... | H02M 3/1584 323/212 |
| 2015/0207400 A1* | 7/2015 | Shenoy | ............... | H02M 3/1584 323/213 |
| 2016/0129792 A1* | 5/2016 | Gohara | ................. | H01L 23/473 310/54 |

* cited by examiner

*Primary Examiner* — Daniel Kessie
*Assistant Examiner* — Terrence Willoughby
(74) *Attorney, Agent, or Firm* — H.C. Park & Associates, PLC

(57) ABSTRACT

Provided is a converter for an HEV system. The converter includes a PCB, a PWM (IC) mounted on the PCB to output a plurality of PWM signals including a first PWM signal and a second PWM signal, a plurality of MOSFETs mounted on the PCB, the plurality of MOSFETs including a first MOSFET, which performs a switching operation according to the first PWM signal, and a second MOSFET which performs a switching operation according to the second PWM signal, and a plurality of inductors including a first inductor, which is magnetized according to the switching operation of the first MOSFET to operate in one phase, and a second inductor which is magnetized according to the switching operation of the second MOSFET to operate in other one phase.

10 Claims, 8 Drawing Sheets

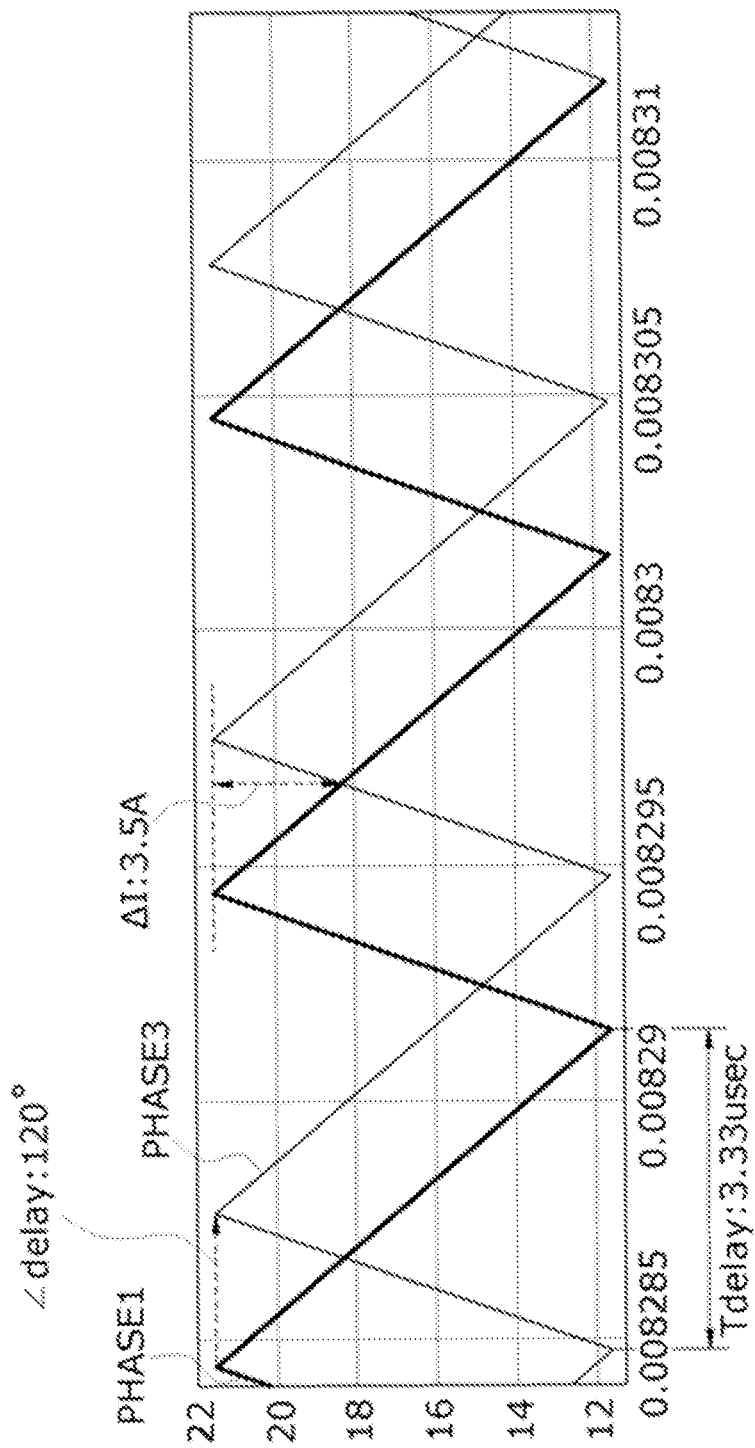

CONVERTER FOR HYBRID ELECTRIC VEHICLE SYSTEM

CROSS-REFERENCE TO RELATED APPLICATIONS

This application claims priority from and the benefit of Korean Patent Application No. 10-2015-0135797, filed on Sep. 24, 2015, which is hereby incorporated by reference for all purposes as if fully set forth herein.

BACKGROUND

Field

The present invention relates to a hybrid electric vehicle (HEV) system, and more particularly, to a converter for an HEV system.

Discussion of the Background

FIG. 1 is a block diagram illustrating a configuration of a belt driving type 48V mild HEV system of the related art.

Referring to FIG. 1, the 48V mild HEV system for reducing an exhaust gas and enhancing fuel efficiency includes an engine 10, an integrated starter generator (ISG) 20 which is directly coupled to a crank pulley of the engine 10 by a belt 15, a 48V battery 30, a converter 40, a 48V electronic device 50, and a 12V battery 60. Although not shown, the 48V mild HEV system may include a control means, and for example, may include a hybrid control unit (HCU), a motor control unit (MCU), and a battery management system (BMS).

A main driving mode of HEVs based on such a configuration, as well known, includes an electric vehicle (EV) mode that is a pure electric vehicle mode using only motor power, an HEV mode which is an assist mode using a torque of an engine as main power and using a torque of a motor as assist power, and a regenerative braking (RB) mode where when a vehicle is driving based on braking or inertia of the vehicle, braking and inertia energy of the vehicle is generated by a motor, is collected, and is charged into a battery.

The converter 40 of the related art 48V mild HEV system, as illustrated in FIG. 1, is disposed between the 48V battery 30 and the 12V battery 60.

When a 12V electronic load increases, the converter 40 operates in a buck mode, and in the buck mode, the converter 40 converts a 48V input voltage into a 14V output voltage and supplies power to the 48V electronic device 50. When power of the 48V electronic device 50 is insufficient, the converter 40 operates in a boost mode, and in the boost mode, the converter 40 converts a 12V input voltage into a 48V output voltage and supplies power to the 48V electronic device 50.

The related art 48V converter uses phase dropping mode (PDM) technology where under a low load condition, only elements (for example, a transistor, an inductor, etc.) which operate in a necessary phase among twelve phases operate, and thus, minimize 1) a switching loss 2) an inductor conduction loss.

The 48V converter has a 12-phase (6-phase interleave, 2 parallel) structure where each of twelve phases is based on power of 200 W, and thus, supplies total power of 2.4 kW. In this case, problems of heat, noise, and/or the like are caused depending on a sequence in which elements operating in twelve phases are arranged. That is, in a PDM, due to a problem (heat concentration) where heat mainly occurs in adjacent elements which operate in four phases under a low load condition, problems such as a malfunction and/or the like are caused by a pulse width modulation (PWM) noise.

SUMMARY

Accordingly, the present invention provides a converter for an HEV system, which disperses heat concentrated in adjacent phases and minimizes noises.

In one general aspect, a converter for an HEV system, which operates in a phase dropping mode (PDM), includes: a printed circuit board (PCB); a pulse width modulation (PWM) integrated circuit (IC) mounted on the PCB to output a plurality of PWM signals including a first PWM signal and a second PWM signal; a plurality of metal oxide semiconductor field effect transistors (MOSFETs) mounted on the PCB, the plurality of MOSFETs including a first MOSFET, which performs a switching operation according to the first PWM signal, and a second MOSFET which performs a switching operation according to the second PWM signal; and a plurality of inductors including a first inductor, which is magnetized according to the switching operation of the first MOSFET to operate in one phase, and a second inductor which is magnetized according to the switching operation of the second MOSFET to operate in other one phase. Here, the PWM IC respectively outputs the first PWM signal and the second PWM signal to the first MOSFET and the second MOSFET which are not adjacent to each other on the PCB.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7 is a graph showing a reduction in noise interference between adjacent phases, in a converter according to an embodiment of the present invention.

DETAILED DESCRIPTION OF ILLUSTRATED EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terms used herein are for the purpose of describing particular embodiments only and are not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, embodiments of the present invention will be described in detail with reference to the accompanying drawings.

First, phase dropping mode (PDM) technology applied to a converter for an HEV system according to an embodiment of the present invention will be briefly described with reference to FIGS. 2 and 3.

The PDM technology may be technology where efficiency is improved by generating (or implementing/driving/realizing/providing) only a necessary phase under a low load condition in order to minimize a degree to which efficiency is reduced due to the switching loss of a metal oxide semiconductor field effect transistor (MOSFET) and the conduction loss of an inductor which occur when an element operates in twelve phases under the low load condition.

Figure 1:
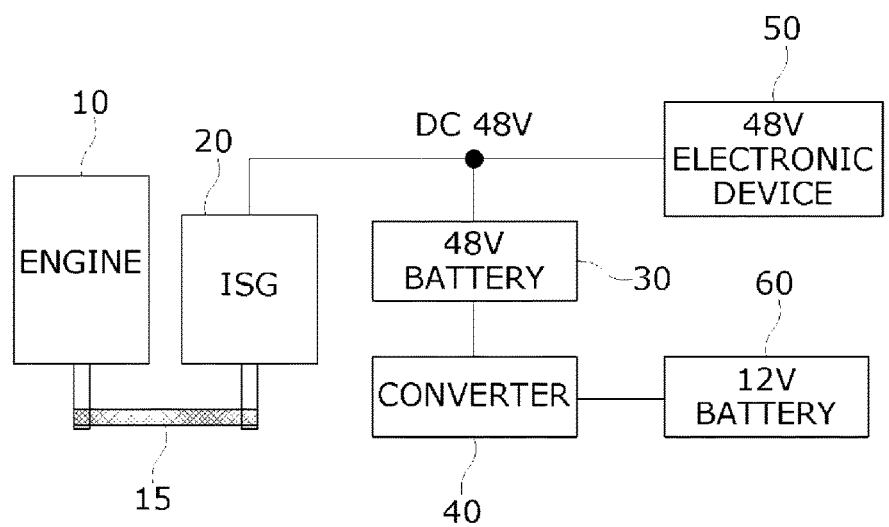
FIG. 1 is a block diagram illustrating a configuration of a belt driving type 48V mild HEV system of the related art.
Figure 2:
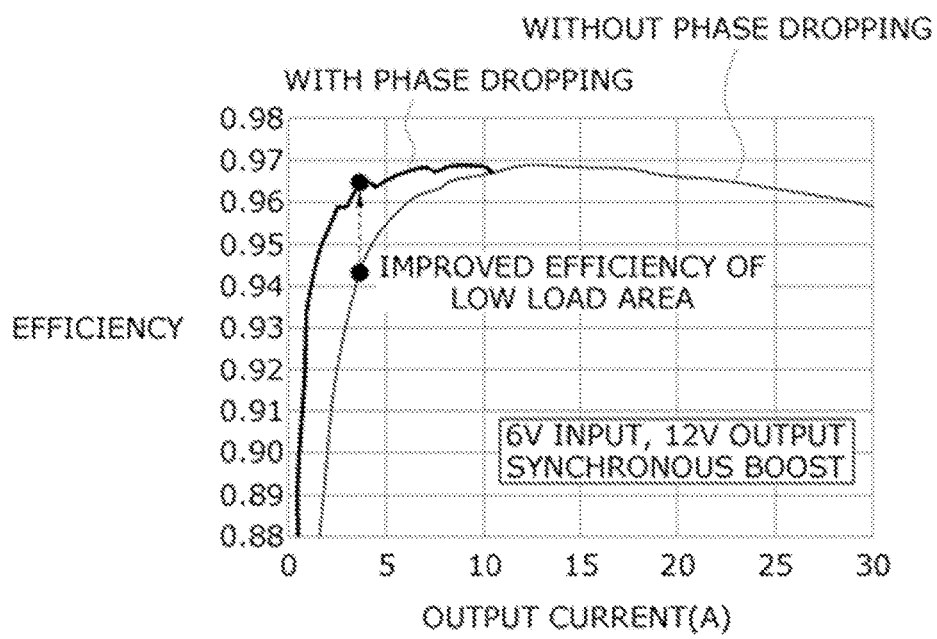
FIGS. 2 and 3 are graphs for briefly describing phase dropping mode (PDM) technology applied to an embodiment of the present invention.

FIG. 2 is a graph showing a result obtained by comparing efficiency of a converter based on a PDM with efficiency of another converter to which the PDM is not applied. In FIG. 2, a red graph is a graph showing the efficiency of the converter based on the PDM, and a blue graph is a graph showing the efficiency of the other converter to which the PDM is not applied.

As shown in FIG. 2, it can be seen that in a low load area where an output current is 5 A or less, the converter based on the PDM is further improved than the other converter to which the PDM is not applied.

Figure 3:
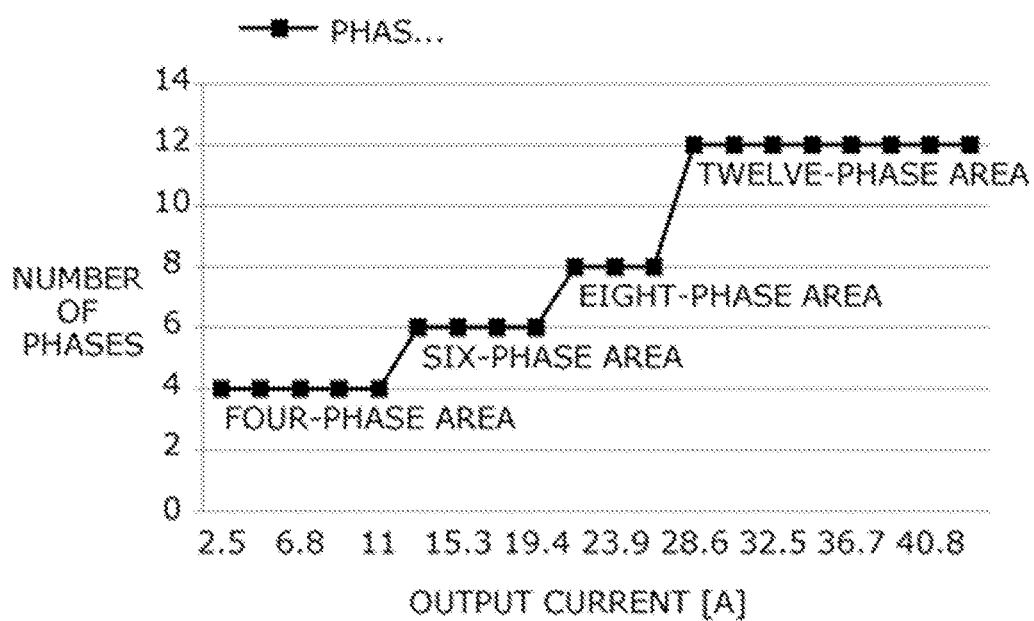

FIG. 3 is a graph showing the number of phases measured based on an output current (an actual load) in the PDM technology applied to an embodiment of the present invention.

Referring to FIG. 3, the PDM applied to an embodiment of the present invention may be executed in four phases when an output current is within a range of 2.5 A to 11 A, may be executed in six phases when the output current is within a range of 12 A to 19.4 A, may be executed in eight phases when the output current is within a range of 20 A to 28.6 A, and may be executed in twelve phases when the output current is 29 A or more, thereby providing optimal efficiency.

Figure 4:
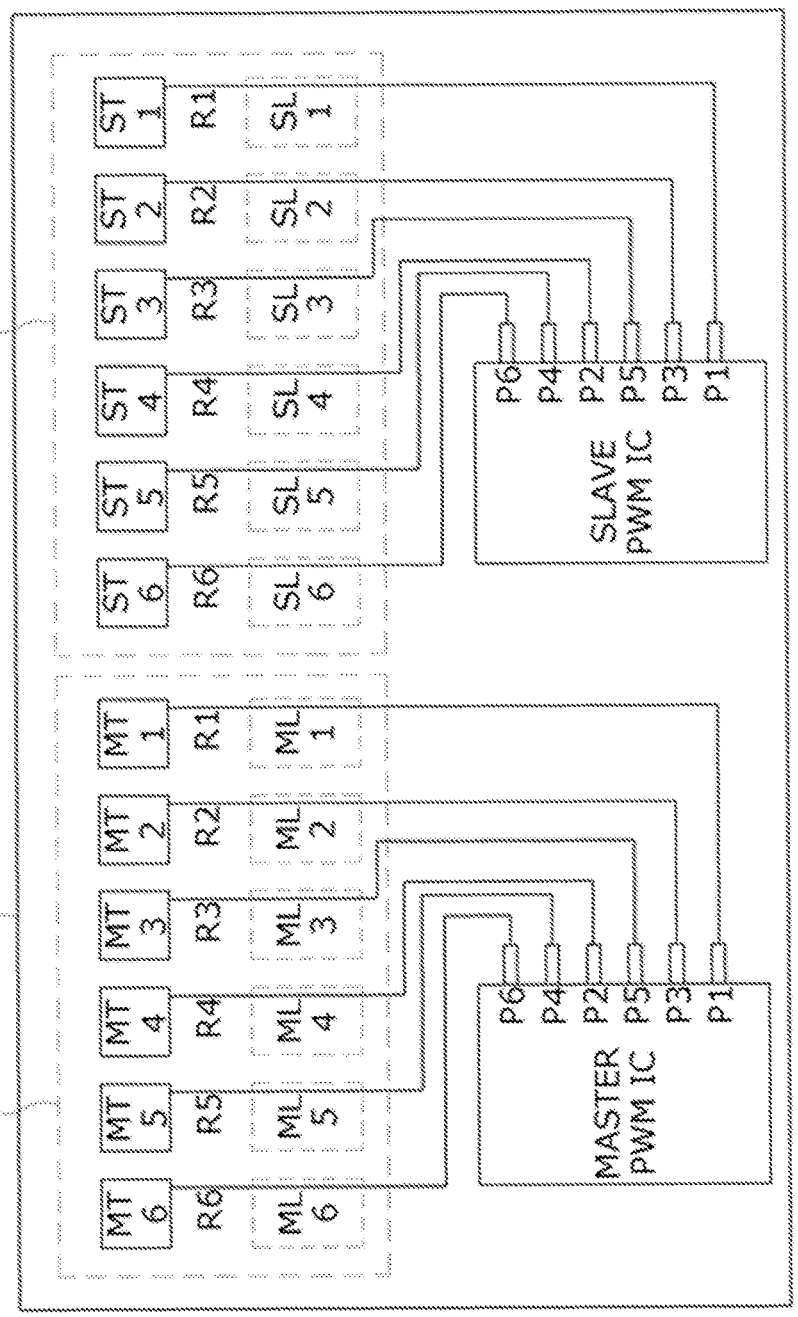
FIG. 4 is a block diagram illustrating a converter for an HEV system according to an embodiment of the present invention.

FIG. 4 is a block diagram illustrating a converter 100 for an HEV system according to an embodiment of the present invention.

Referring to FIG. 4, the converter 100 for the HEV system according to an embodiment of the present invention may include a printed circuit board (hereinafter referred to as a board) 110, a plurality of MOSFETs MT1 to MT6 and ST1 to ST6 mounted on the board 110, a plurality of inductors ML1 to ML6 and SL1 to SL6 mounted on the board 110, and a plurality of pulse width modulation (PWM) integrated circuits (ICs) 112 and 114 mounted on the board 110. Here, without the present embodiment being specially limited, the MOSFETs MT1 to MT6 and ST1 to ST6 and the PWM ICs 112 and 114 may be mounted on a top of the board 110, and the inductors ML1 to ML6 and SL1 to SL6 may be mounted on a bottom of the board 110. In FIG. 4, a state where the inductors ML1 to ML6 and SL1 to SL6 are mounted on a bottom of the board 110 is illustrated as a dotted-line box.

A master control area MCA and a slave control area SCA may be defined on the board 110.

The MOSFETs MT1 to MT6 and the inductors ML1 to ML6 may be mounted in the master control area MCA, and the MOSFETs ST1 to ST6 and the inductors SL1 to SL6 may be mounted in the slave control area SCA.

The MOSFETs MT1 to MT6 and the inductors ML1 to ML6 mounted in the master control area MCA may be electrically connected to each other, and the MOSFETs MT1 to MT6 may each perform a switching operation including a turn-on operation and a turn-off operation in response to a master control PWM signal.

By performing the switching operation, each of the MOSFETs MT1 to MT6 may apply an alternating current (AC) voltage to both ends of a corresponding inductor among the inductors ML1 to ML6, and thus, a magnetization current may flow in the corresponding inductor. The corresponding inductor where the magnetizing current flows may operate in one phase.

The MOSFETs ST1 to ST6 and the inductors SL1 to SL6 mounted in the slave control area SCA may be electrically connected to each other, and the MOSFETs ST1 to ST6 may each perform the switching operation including the turn-on operation and the turn-off operation in response to a slave control PWM signal.

By performing the switching operation, each of the MOSFETs ST1 to ST6 may apply an AC voltage to both ends of a corresponding inductor among the inductors SL1 to SL6, and thus, the magnetization current may flow in the corresponding inductor. The corresponding inductor where the magnetizing current flows may operate in one phase.

In an embodiment, since six inductors ML1 to ML6 and are mounted in the master control area MCA and six inductors SL1 to SL6 are mounted in the slave control area SCA, the converter 100 according to an embodiment of the present invention may operate in a total of twelve phases.

The PWM ICs 112 and 114 may include a master PWM IC 112 and a slave PWM IC 114.

The master PWM IC 112 may output the PWM signal including first to sixth PWM signals PWM1 to PWM6, for controlling the switching operations of the MOSFETs MT1 to MT6 mounted in the master control area MCA of the board 110.

The master PWM IC 112 may include output pins Nos. 1 to 6 P1 to P6 of which numbers are designated, and the output pins Nos. 1 to 6 P1 to P6 may the first to sixth PWM signals PWM1 to PWM6 in ascending or descending order of their designated numbers.

The six output pins P1 to P6 may be electrically connected to the MOSFETs MT1 to MT6 by first to sixth wirings R1 to R6, respectively.

In detail, the output pin No. 1 P1 may be electrically connected to a gate terminal of a first MOSFET MT1 by a first wiring R1, and the output pin No. 3 P3 may be electrically connected to a gate terminal of a second MOSFET MT2 by a second wiring R2. Also, the output pin No. 5 P5 may be electrically connected to a gate terminal of a third MOSFET MT3 by a third wiring R3, and the output pin No. 2 P2 may be electrically connected to a gate terminal of a fourth MOSFET MT4 by a fourth wiring R4. Also, the output pin No. 4 P4 may be electrically connected to a gate terminal of a fifth MOSFET MT5 by a fifth wiring R5, and the output pin No. 6 P6 may be electrically connected to a gate terminal of a sixth MOSFET MT6 by a sixth wiring R6.

The slave PWM IC 114 may include output pins Nos. 1 to 6 P1 to P6 of which numbers are designated identically to the master PWM IC 112, and the output pins Nos. 1 to 6 P1 to P6 may the first to sixth PWM signals PWM1 to PWM6 in ascending or descending order of their designated numbers.

Moreover, a wiring connection pattern that respectively connects the output pins P1 to P6 of the slave PWM IC 114 to the MOSFETs ST1 to ST6 may be the same as a wiring connection pattern that respectively connects the output pins P1 to P6 of the master PWM IC 112 to the MOSFETs MT1 to MT6, and thus, its detailed description is omitted. That is, the description of wiring connection pattern that respectively connects the output pins P1 to P6 of the master PWM IC 112 to the MOSFETs MT1 to MT6 is applied thereto.

According to an embodiment of the present invention, due to the wiring connection pattern between the master PWM IC 112 and the MOSFETs MT1 to MT6 and the wiring connection pattern between the slave PWM IC 114 to the MOSFETs ST1 to ST6, a problem (heat concentration) where heat is concentrated by adjacent phases is solved, and a problem (occurrence of noise) of a malfunction caused by noise which occurs due to adjacent phases is solved.

In detail, it may be assumed that the converter 100 according to an embodiment of the present invention operates in four phases, namely, the master PWM IC 112 sequentially outputs the first PWM signal PWM1 and the second PWM signal PWM2 through the output pin No. 1 P1 and the output pin No. 2 P2 thereof in ascending order, and the slave PWM IC 114 sequentially outputs the first PWM signal PWM1 and the second PWM signal PWM2 through the output pin No. 1 P1 and the output pin No. 2 P2 thereof in ascending order.

In this case, according to the wiring connection pattern according to an embodiment of the present invention, in the master control area MCA, since the output pin No. 1 P1 is electrically connected to the first MOSFET MT1 and the output pin No. 2 P2 is electrically connected to the fourth MOSFET MT4, the MOSFETs MT1 and MT4 which are spaced (are not adjacent) apart from each other with the MOSFETs MT2 and MT3 therebetween may perform the switching operation, and thus, the inductors ML1 and ML4 which are spaced (are not adjacent) apart from each other with the inductors ML2 and ML3 therebetween may each operate in one phase.

Likewise, in the slave control area SCA, the MOSFETs ST1 and ST4 may perform the switching operation, and thus, the inductors SL2 and SL3 which are spaced (are not adjacent) apart from each other with the inductors SL1 and SL4 therebetween may each operate in one phase.

Figure 5A:
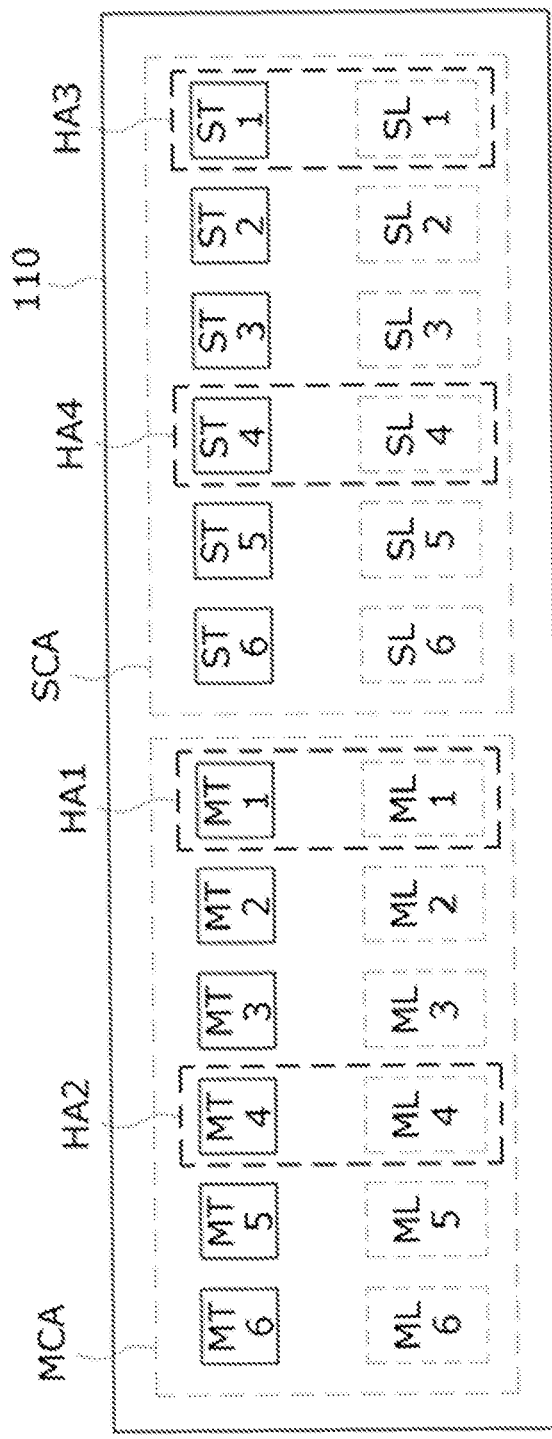
FIGS. 5A and 5B are a diagram illustrating a heating area which is provided on a board when four phases and eight phases operate, according to an embodiment of the present invention.

In this manner, it can be seen that in a heating area which is provided on the board 110 when the converter 100 according to an embodiment of the present invention operates in four phases, as illustrated in FIG. 5A, a heating area HA1 including the MOSFET MT1 and the inductor ML1 and a heating area HA2 including the MOSFET MT4 and the inductor ML4 are spaced apart from each other in the master control area MCA, and a heating area HA3 including the MOSFET ST1 and the inductor SL1 and a heating area HA4 including the MOSFET ST4 and the inductor SL4 are spaced apart from each other in the slave control area SCA.

Figure 6A:
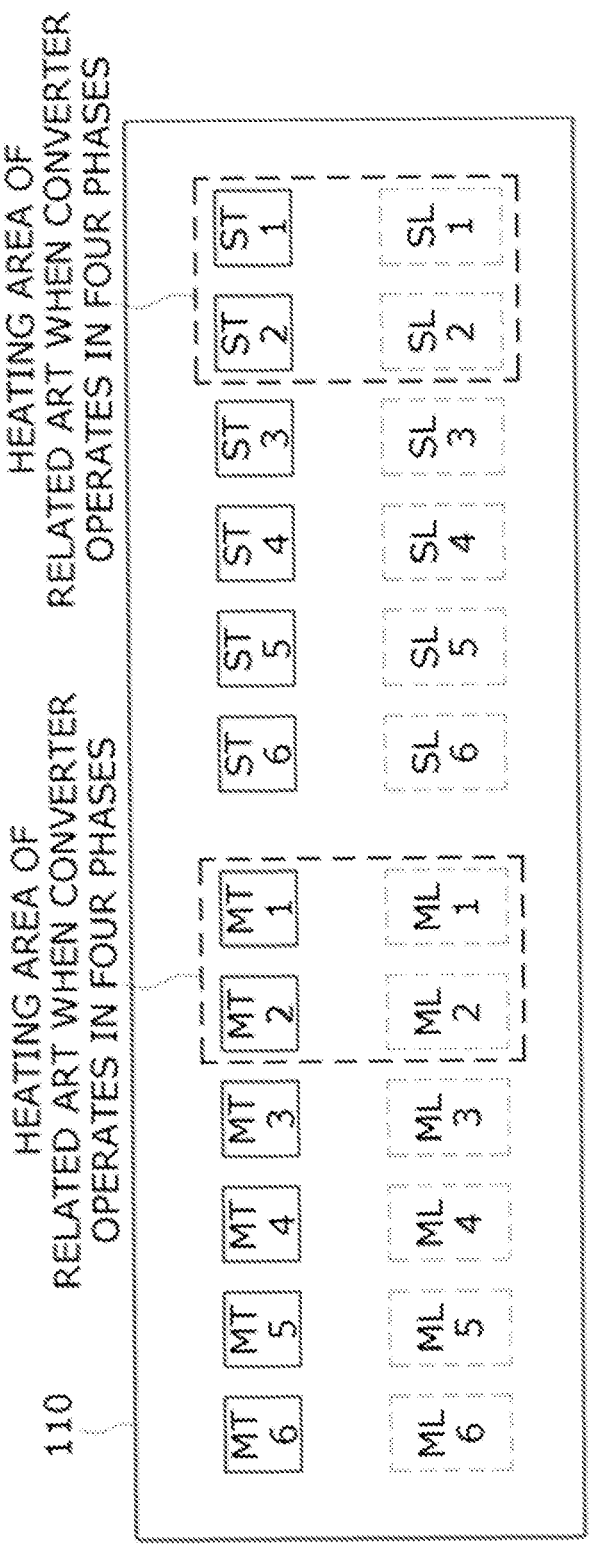
FIGS. 6A and 6B are a diagram illustrating a heating area which is provided on a board when four phases and eight phases operate, in the related art.

In comparison with a heating area provided on a board in the related art converter illustrated in FIG. 6A, it can be easily seen that when the converter 100 according to an embodiment of the present invention operates in four phases, heat which is concentrated due to adjacent phases is very efficiently dispersed.

Moreover, even in a case where the converter 100 according to an embodiment of the present invention operates in eight phases, heat which is concentrated due to adjacent phases when the converter 100 operates in eight phases is very efficiently dispersed.

In detail, when the converter 100 operates in eight phases, namely, when the master PWM IC 112 sequentially outputs the first to fourth PWM signals PWM1 to PWM4 through the output pins Nos. 1 to 4 P1 to P4 thereof in ascending order, and the slave PWM IC 114 sequentially outputs the first to fourth PWM signals PWM1 to PWM4 through the output pins Nos. 1 to 4 P1 to P4 thereof in ascending order, by using the wiring connection pattern illustrated in FIG. 4, in the master control area MCA, the MOSFETs MT1, MT2, MT4 and MT5 may perform the switching operation, and thus, the inductors ML1, ML2, ML4 and ML5 may operate in one phase. In this case, in the slave control area SCA, the MOSFETs ST1, ST2, ST4 and ST5 may perform the switching operation, and thus, the inductors SL1, SL2, SL4 and SL5 may operate in one phase.

Figure 5B:
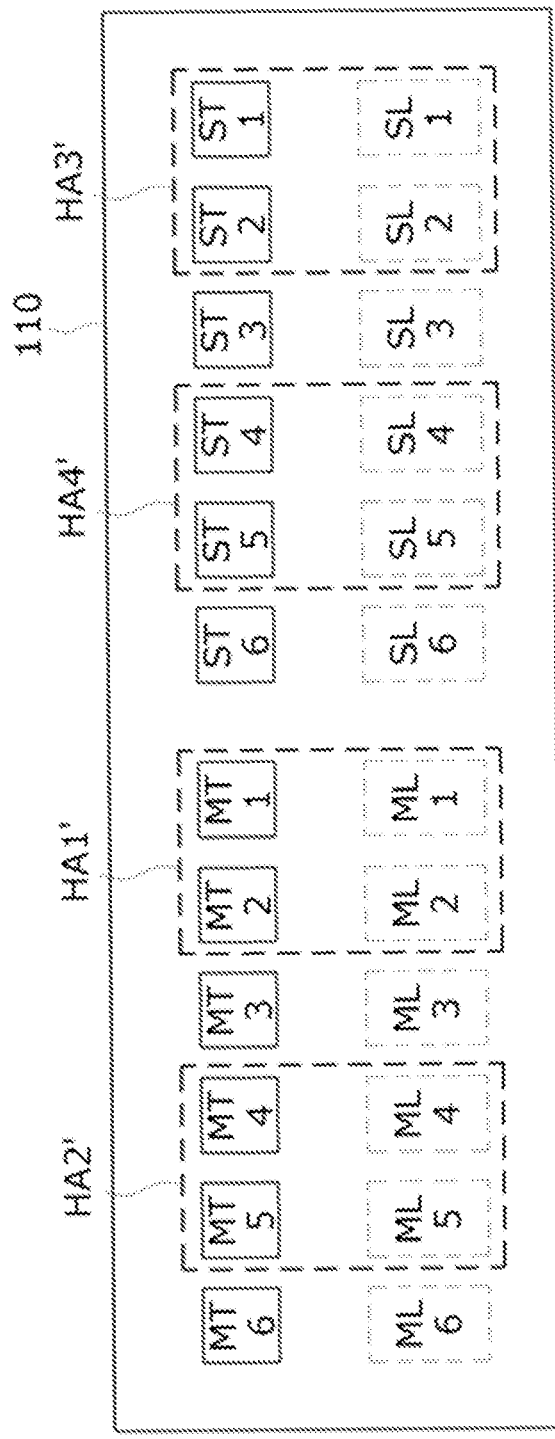

In this manner, it can be seen that in a heating area which is provided on the board 110 when the converter 100 according to an embodiment of the present invention operates in eight phases, as illustrated in FIG. 5B, a heating area HA1' including the MOSFETs MT1 and MT2 and the inductors ML1 and ML2 and a heating area HA2' including the MOSFETs MT4 and MT5 and the inductors ML4 and ML6 are spaced apart from each other with the MOSFET MT3 and the inductor ML3 therebetween in the master control area MCA, and a heating area HA3' including the MOSFETs ST1 and ST2 and the inductors SL1 and SL2 and a heating area HA4' including the MOSFETs ST4 and ST5 and the inductors SL4 and SL6 are spaced apart from each other with the MOSFET ST3 and the inductor SL3 therebetween in the slave control area SCA.

Figure 6B:
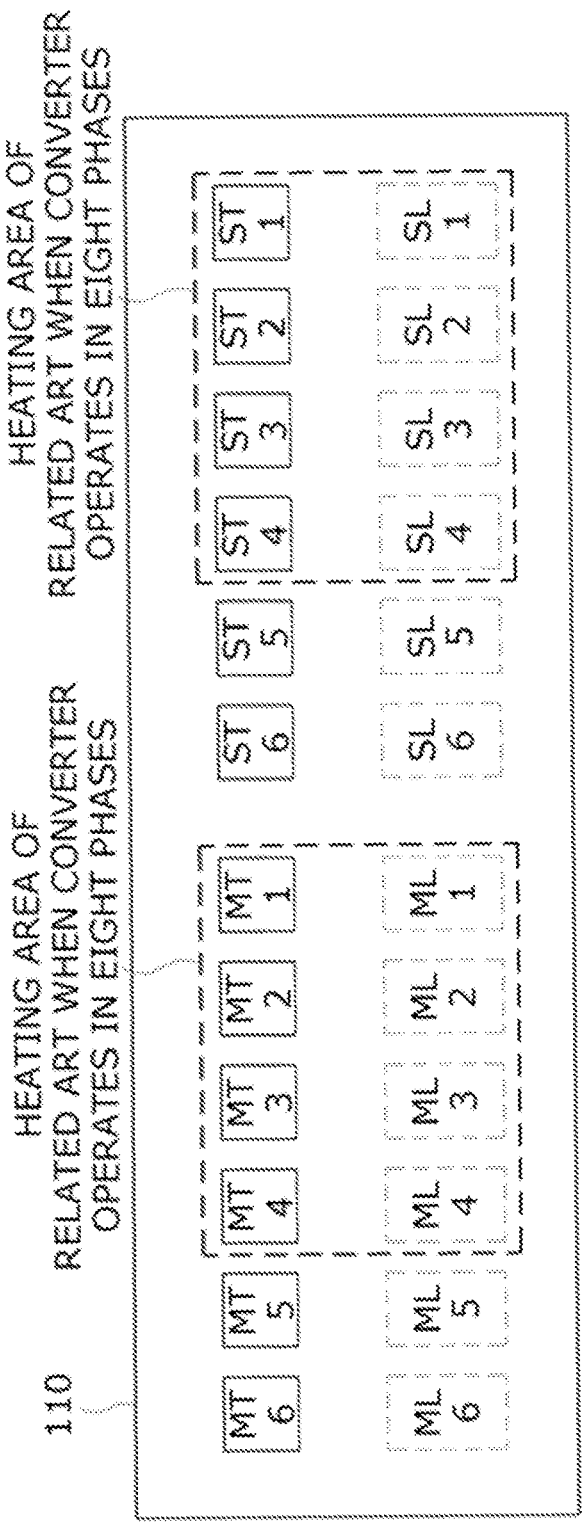

In comparison with a heating area which is provided on a board when the related art converter illustrated in FIG. 6B operates in eight phases, it can be easily seen that when the converter 100 according to an embodiment of the present invention operates in eight phases, heat which is concentrated due to adjacent phases is very efficiently dispersed.

According to an embodiment of the present invention, heat which is concentrated due to adjacent phases is dispersed, and moreover, noises between the adjacent phases are minimized. That is, as illustrated in FIG. 7, a one-phase PWM operation may end, and then, a three-phase PWM signal may be applied, whereby interference between phases does not occur.

According to the embodiments of the present invention, in a case where n (where n is a natural number) phases among twelve phases are generated in the PDM of the converter, phases are not simultaneously generated from adjacent transistors, thereby minimizing heat dispersion and noises.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A converter for a hybrid electric vehicle (HEV) system, which is configured to operate in a phase dropping mode (PDM), the converter comprising:
   a printed circuit board (PCB);
   a pulse width modulation (PWM) integrated circuit (IC) mounted on the PCB configured to output a plurality of PWM signals including a first PWM signal and a second PWM signal;
   a plurality of metal oxide semiconductor field effect transistors (MOSFETs) mounted on the PCB, the plurality of MOSFETs comprising a first MOSFET, which is configured to perform a switching operation according to the first PWM signal, and a second MOSFET which is configured to perform a switching operation according to the second PWM signal; and
   a plurality of inductors comprising a first inductor, which is configured to be magnetized according to the switching operation of the first MOSFET to operate in one phase, and a second inductor which is configured to be magnetized according to the switching operation of the second MOSFET to operate in another phase,
   wherein the PWM IC is configured to respectively output the first PWM signal to the first MOSFET and the second PWM signal to the second MOSFET, wherein the first MOSFET and the second MOSFET are not adjacent to each other on the PCB.

2. The converter of claim 1, further comprising: a plurality of wirings,
   wherein the plurality of wirings comprise:
   a first wiring configured to transmit the first PWM signal to the first MOSFET; and
   a second wiring configured to transmit the second PWM signal to the second MOSFET which is not adjacent to the first MOSFET on the PCB.

3. The converter of claim 1, wherein the plurality of MOSFETs comprise:
   a plurality of master MOSFETs arranged in at least one row in a master control area of the PCB; and
   a plurality of slave MOSFETs arranged in at least one row in a slave control area of the PCB.

4. The converter of claim 3, wherein the plurality of inductors comprise:
   a plurality of master inductors arranged in parallel with the plurality of master MOSFETs in the master control area of the PCB; and
   a plurality of slave inductors arranged in parallel with the plurality of slave MOSFETs in the slave control area of the PCB.

5. The converter of claim 3, wherein when the converter operates in four phases, the master control area of the PCB comprises
   a first heating area, comprising a first master MOSFET and a first master inductor arranged in parallel with the first master MOSFET; and
   a second heating area, comprising a second master MOSFET and a second master inductor arranged in parallel with the second master MOSFET; wherein
   the second master MOSFET is not adjacent to the first master MOSFET.

6. The converter of claim 5, wherein when the converter operates in four phases, the slave control area of the PCB comprises
   a third heating area, comprising a first slave MOSFET and a first slave inductor arranged in parallel with the first slave MOSFET, and
   a fourth heating area comprising a second slave MOSFET and a second slave inductor arranged in parallel with the second slave MOSFET; wherein
   the second slave MOSFET is not adjacent to the first slave MOSFET.

7. The converter of claim 4, wherein when the converter operates in eight phases, the master control area of the PCB comprises
   a first heating area, comprising a first master MOSFET, a first master inductor arranged in parallel with the first master MOSFET, a second master MOSFET adjacent to the first master MOSFET, and a second master inductor arranged in parallel with the second master MOSFET, and;
   and a second heating area, comprising a third master MOSFET, a third master inductor arranged in parallel with the third master MOSFET, the fourth master MOSFET adjacent to the third master MOSFET, and a fourth master inductor arranged in parallel with the fourth master MOSFET; wherein
   the third and fourth master MOSFETS are not adjacent to the first or second MOSFETs.

8. The converter of claim 7, wherein when the converter operates in eight phases, the slave control area of the PCB comprises
   a third heating area', comprising a first slave MOSFET, a first slave inductor arranged in parallel with the first slave MOSFET, a second slave MOSFET adjacent to the first slave MOSFET, and a second slave inductor arranged in parallel with the second slave MOSFET; and
   a fourth heating area comprising a third slave MOSFET, a third slave inductor arranged in parallel with the third slave MOSFET, a fourth slave MOSFET adjacent to the third slave MOSFET, and a fourth slave inductor arranged in parallel with the fourth slave MOSFET.

9. The converter of claim 3, wherein the PWM IC comprises a first PWM IC and a second PWM IC, wherein the first PWM IC and the second PWM IC each comprise six output pins.

10. The converter of claim 9, wherein
    an output pin No. 1 is electrically connected to a first MOSFET by a first wiring in the master control area or the slave control area,
    an output pin No. 3 is electrically connected to a second MOSFET by a second wiring in the master control area or the slave control area,
    an output pin No. 5 is electrically connected to a third MOSFET by a third wiring in the master control area or the slave control area,
    an output pin No. 2 is electrically connected to a fourth MOSFET by a fourth wiring in the master control area or the slave control area,
    an output pin No. 4 is electrically connected to a fifth MOSFET by a fifth wiring in the master control area or the slave control area, and
    an output pin No. 6 is electrically connected to a sixth MOSFET by a sixth wiring in the master control area or the slave control area.

* * * * *